K. PROBST.
TRANSMISSION GEARING.
APPLICATION FILED SEPT. 28, 1908.
968,495.
Patented Aug. 23, 1910.
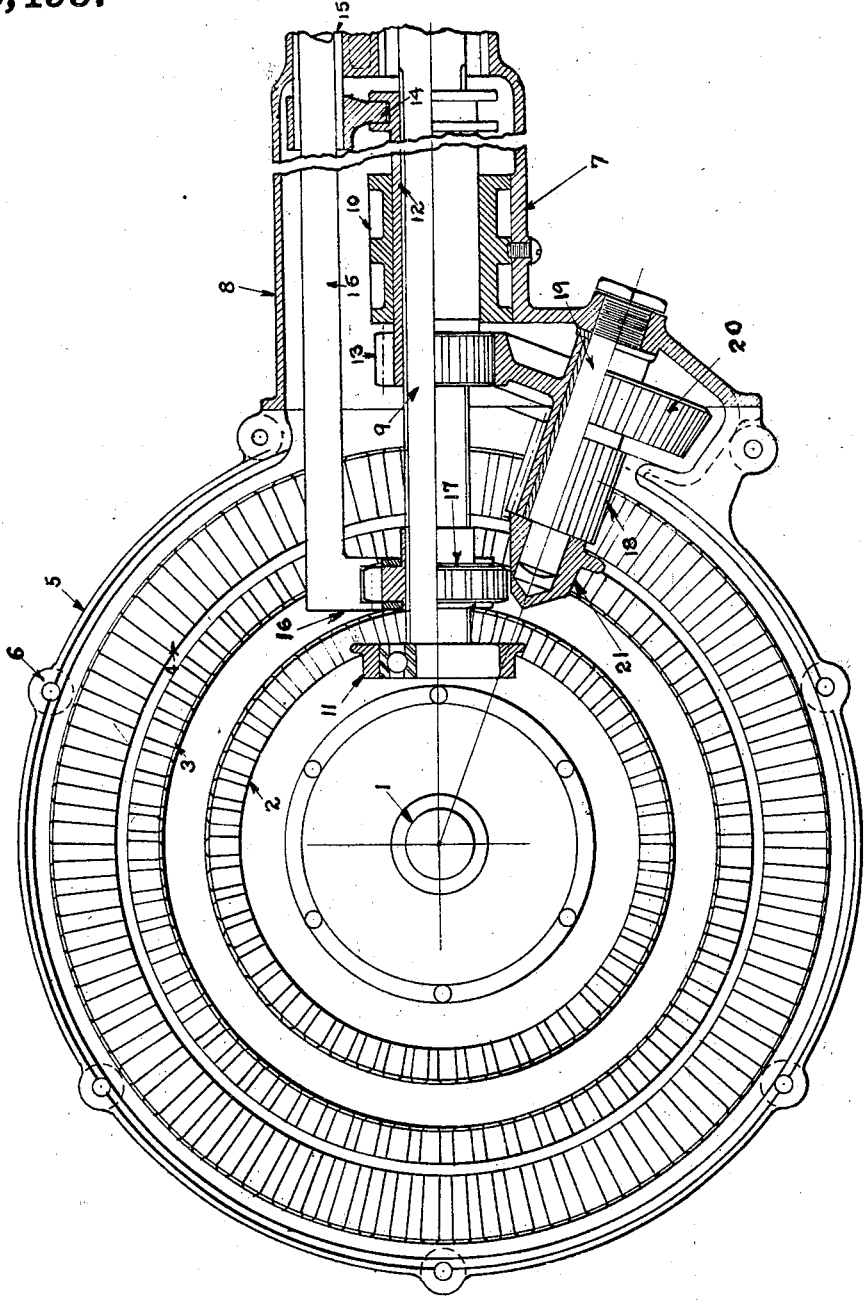
WITNESSES:
Roy Brewholt
A. Rager
Karl Probst
INVENTOR.
BY
Geo W. Rq......
ATTORNEY.

UNITED STATES PATENT OFFICE.

KARL PROBST, OF COLUMBUS, OHIO, ASSIGNOR OF FIFTY-ONE ONE-HUNDREDTHS TO THE SEAGRAVE COMPANY, OF COLUMBUS, OHIO, A CORPORATION OF OHIO.

TRANSMISSION-GEARING.

968,495.  Specification of Letters Patent.  Patented Aug. 23, 1910.

Application filed September 28, 1908. Serial No. 455,206.

*To all whom it may concern:*

Be it known that I, KARL PROBST, a citizen of the United States, residing at Columbus, in the county of Franklin and State of Ohio, have invented certain new and useful Improvements in Transmission-Gearing, of which the following is a specification.

My invention relates to improvements in transmission gearing and comprises especially the use of a crown gear plate having a plurality of rows of concentric teeth thereon providing thereby for a number of speeds, and actuating pinions so disposed that no pinion need be moved through one row of teeth to reach another row with which it is desired to mesh. It has been found that where more than two speeds are provided for, a single actuating pinion is unsatisfactory, for the reason that pinions of different sizes are preferable for producing the high and the low speeds. Further, it is undesirable to slide one actuating pinion through one or more gears in order to reach the gear selected for the particular speed desired.

In my improvements hereinafter described, I contemplate especially the use of two driving pinions adapted to be operated selectively, one of said pinions being mounted to mesh with the high and intermediate speed gears, and to lie neutrally between the same, and a second pinion mounted on the same shaft adapted to mesh with the low speed gear and also to actuate the reverse gear. I attain by this construction the advantage of having a relatively large pinion for the high and intermediate speeds which is not required to be moved through one gear to reach another, but is movable at will from its neutral position into mesh with either of the said high and intermediate speed gears. The pinion adapted to drive the low speed gear is also constructed to actuate the reverse pinion. Essentially therefore my construction provides for the use of two pinions adapted to be selectively operated and which are mounted on the same shaft, and so arranged that it is not required to slide a pinion through a gear in order to reach the gear which it is desired to actuate.

These improvements render possible a compact and desirable construction and arrangement of parts.

In the drawings which are hereto attached and hereby made a part of this specification, the figure shows a face view of the gears with the actuating parts partly in section.

In the drawings in which the same numeral indicates the same part throughout, 1 is the axle or shaft to the actuated, upon which are mounted the concentric gears 2, 3, and 4, which are respectively the high, intermediate, and low speed gears. The teeth on these gears are preferably machine cutting, the gears being the kind known as crown gears, which I find to possess advantages over bevel gears in transmission constructions. The gears are appropriately inclosed by a casing, one member of which is shown, which is adapted to be secured to a similar casing member by bolts inserted through the openings 6 in a well known manner; the continuation of the casing in section is shown at 7 and 8, it being understood that these casing members are preferably mounted appropriately upon the vehicle or other structure which is adapted to be actuated. The driving shaft 9 is mounted in appropriate bearings 10 and 11, and has mounted thereon the sleeve or tube member 12 carrying at its inner end the pinion 13; the tube or sleeve 12 is adapted to be positioned by the shaft lever 14 mounted upon the tube 15 which is adapted to be actuated by a lever in the usual manner within easy reach of the operator. The rod 16 is positioned in the tube 15 and is also adapted to be actuated by the said lever, and carries at its inner end the forked shifting lever 16 for positioning the pinion 17 as desired by simply moving the latter along the shaft 9 either inwardly or outwardly.

The reverse pinion 18 is mounted on the stub shaft 19 and actuated through the gear 20, which is adapted to be driven by the pinion 13. It is seen that the reverse pinion 18 meshes with the gear 4. The reverse construction is mounted in an appropriate casing 21 which is appropriately mounted upon the vehicle or structure in connection with which the transmission gearing is used.

The operation is as follows: Normally, the pinion 17 is positioned between the concentric gears 2 and 3, and the pinion 13 is positioned between the gear 4 and the reverse gear 20; to operate the high speed gear, the lever controlling the shifting lever 16 is actuated, whereby the pinion 17 is moved into mesh with the high speed gear 2. To drive at the intermediate speed the pinion 17 will be withdrawn and meshed with gear 3, it being the purpose to move the pinion 17 into its operating position without requiring it to pass through one gear to reach another, which is found to be a preferred construction. To drive at low speed, the operator moves the said lever to actuate the tube 15, which, through the forked lever 14, will move the sleeve 12 carrying the pinion 13 into mesh with the gear 4, and the driving will thereupon take place at a low speed; to drive in the reverse direction, the pinion 13 is withdrawn from gear 4 and meshed with gear 20, which thereupon actuates the reverse pinion 18, which is in mesh with gear 4, whereupon the driving in the reverse direction takes place through the low speed gear. It is seen that the pinion 13 is not required to be moved through one gear to reach another.

Therefore by my improved construction I obviate the necessity of sliding a driving pinion through one gear to reach a gear which it is desired to operate; I employ preferably two actuating pinions both mounted upon the same shaft, whereby a very compact construction is rendered possible.

Although I have shown crown gears with machine cutting teeth, yet I do not desire to confine myself to this construction of teeth, inasmuch as it is possible to use my arrangement of shafts and pinions with teeth formed in other ways.

What I claim is:

1. A transmission gearing comprising a plurality of concentric gears, a driving shaft, a pinion slidably mounted thereon between two of said gears and adapted to be moved forwardly or rearwardly to enmesh therewith as desired, a second slidable pinion mounted on said shaft adapted to actuate another of said gears from one of its positions, and reverse gearing adapted to be actuated by said second pinion when the latter has been shifted to another position.

2. In a transmission gearing, a plurality of concentric gears adapted to produce high, intermediate, and low speeds, reverse gearing adapted to mesh with said low speed gear, a driving shaft, a pinion thereon positioned normally between the high and the intermediate speed gears and adapted to be brought into mesh with either at will, a second pinion on said shaft adapted to actuate the low speed gear and the reverse gearing selectively at will.

3. A transmission gearing comprising concentric gears adapted to produce high, intermediate, and low speeds respectively, a driving shaft, a stub shaft, a reverse gear and pinion mounted thereon, said pinion being adapted to mesh with the said low speed gear, a pinion on said driving shaft positioned normally between said high and intermediate speed gears and adapted to mesh with either at will, a second pinion on said driving shaft positioned normally between said low speed gear and said reverse gear and adapted to be brought into mesh with either at will, and means for controlling said pinions.

4. In a transmission gearing a plurality of concentric gears adapted to produce high, intermediate, and low speeds respectively, a driving shaft, a slidable pinion thereon normally positioned between two of said gears and adapted to be brought into mesh with either at will, and a second slidable pinion on said shaft adapted to be brought into mesh with the remaining gear.

In testimony whereof I affix my signature in the presence of two witnesses.

KARL PROBST.

Witnesses:
GEO. W. RIGHTMIRE,
ROY BRENHOLTS.